(12) United States Patent
Park

(10) Patent No.: US 9,847,643 B2
(45) Date of Patent: Dec. 19, 2017

(54) SYSTEM AND METHOD FOR MANAGING AC POWER USING AUXILIARY DC-TO-AC INVERSION

(71) Applicant: Sharp Laboratories of America, Inc., Camas, WA (US)

(72) Inventor: Daniel Park, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 711 days.

(21) Appl. No.: 14/446,092

(22) Filed: Jul. 29, 2014

(65) Prior Publication Data

US 2016/0036228 A1 Feb. 4, 2016

(51) Int. Cl.
*H02J 3/06* (2006.01)
*H02J 3/38* (2006.01)
*H02J 3/14* (2006.01)

(52) U.S. Cl.
CPC .............. *H02J 3/381* (2013.01); *H02J 3/14* (2013.01); *Y02B 70/3225* (2013.01); *Y04S 20/222* (2013.01)

(58) Field of Classification Search
CPC ......... H02J 3/14; H02J 3/381; Y02B 70/3225; Y04S 20/222
USPC .......................................................... 307/52
See application file for complete search history.

(56) References Cited

U.S. PATENT DOCUMENTS

| | | | | |
|---|---|---|---|---|
| 4,528,457 A | * | 7/1985 | Keefe | H02M 7/48 307/46 |
| 2009/0027932 A1 | * | 1/2009 | Haines | H02J 9/062 363/95 |
| 2010/0188869 A1 | * | 7/2010 | Fredette | H02M 1/10 363/15 |
| 2011/0099111 A1 | * | 4/2011 | Levy | G06Q 30/0207 705/63 |
| 2011/0106328 A1 | * | 5/2011 | Zhou | G05B 13/024 700/291 |
| 2011/0204720 A1 | * | 8/2011 | Ruiz | B60L 11/1816 307/66 |
| 2011/0282513 A1 | * | 11/2011 | Son | B60L 11/1816 700/297 |
| 2012/0005126 A1 | * | 1/2012 | Oh | G06Q 50/06 705/412 |
| 2012/0248875 A1 | * | 10/2012 | Fang | H02M 7/42 307/66 |

(Continued)

*Primary Examiner* — Zeev V Kitov
*Assistant Examiner* — Brian K Baxter
(74) *Attorney, Agent, or Firm* — Law Office of Gerald Maliszewski; Gerald Maliszewski

(57) ABSTRACT

A system and method are provided for managing demand for a client with a fluctuating AC power grid demand, using DC-to-AC power inversion as an auxiliary source of power. The inverter has a selectable inversion power output levels connected to the AC client to supply auxiliary power for a portion of the AC power demand. The AC grid demand is averaged. In each of a series of periodic time intervals, a current AC grid demand average in a current time interval is compared to a demand goal, which is the highest AC grid demand average, as measured at an end of a time interval, and selected from a plurality of time intervals. The inverter output power level is selected so that the current AC grid demand average is less than or equal to the demand goal by the end of the current time interval.

24 Claims, 6 Drawing Sheets

(56) References Cited

U.S. PATENT DOCUMENTS

2014/0005852 A1* 1/2014 Asghari .................. G06F 1/26
700/295

* cited by examiner

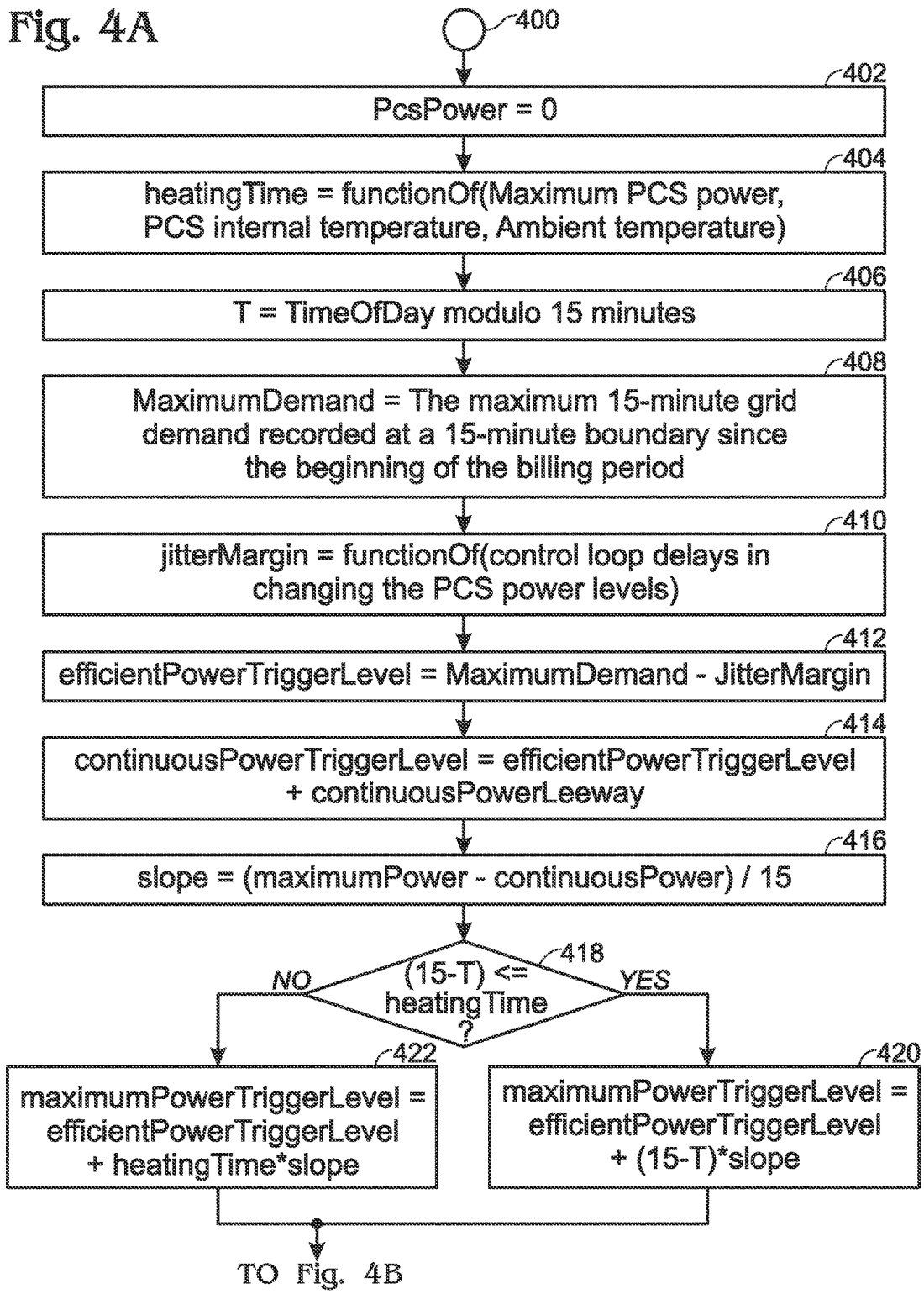

SYSTEM AND METHOD FOR MANAGING AC POWER USING AUXILIARY DC-TO-AC INVERSION

BACKGROUND OF THE INVENTION

1. Field of the Invention

This invention generally relates to direct current (DC)-to-alternating current (AC) power inversion and, more particularly, to a system and method for efficiently managing to use of DC-to-AC power inversion for a client using metered AC power from a utility.

2. Description of the Related Art

DC-to-AC power converters or inverters tend to have an efficiency curve that peaks at an optimum power output level, with a relatively low efficiency at high power settings. Typical load-following peak management systems track the load when it is above a target demand level. Thus, the power inverter may spend a significant amount of time at low efficiency power settings. This results in a waste of DC energy that is being supplied to hold down the AC electric demand. When the source of DC energy is a battery, this inefficiency results in a waste of limited battery capacity.

Electric peak demand systems that track the AC demand continuously attempt to hold the AC demand at or below the targeted peak demand level. Typically, an electric utility company only measures the demand in 15-minute block periods with the measurements being recorded at minutes 00, 15, 30, and 45. Since the instantaneous demand can vary significantly, the actual peak demand of a continuously rolling 15-minute period may occur in between the power company's measurement times. If the peak demand happens to occur during the measurement time, the client's billing rate is adversely affected.

It would be advantageous if an electric utility client could manage their AC usage, using a DC-to-AC power inverter, to minimize their demand from the utility at measurement times, thus minimizing their billing expense.

SUMMARY OF THE INVENTION

Disclosed herein is a direct current (DC)-to-alternating current (AC) power converter (inverter) that is normally operated at either its maximum efficiency power discharge point or at zero power, to supply auxiliary power to a client using AC power from an electric utility. This is a "duty cycle" scheme. Since the electric demand is measured at periodic intervals (e.g. a 15-minute period), it is only necessary to keep the average demand from the utility below the target demand level. The duty cycling of the power between zero and its maximum efficiency point is smoothed by the 15-minute average, resulting in accurate control of the peak demand and excellent power inverter efficiency.

This system and method manage the power output of a DC-to-AC power converter to optimize the efficiency of the power inverter and avoid inefficient use of battery capacity. Auxiliary power from the inverter is maximized near any scheduled electric demand time (e.g. minutes 00, 15, 30, and 45) to assure that the 15-minute average demand is at or below the managed target level, resulting in conserved battery capacity. Such as system also allows for more accurate tracking of the target demand level and it reduces the impact of system control jitter.

As a result the auxiliary power demand supplied by the inverter can be allowed to drift above the peak demand target during the measurement interval by using more sophisticated trigger points. As a first step, the power inverter is activated when the AC grid demand average is at or above the demand target during the beginning of the measurement period. This step is intended to save battery capacity. The trigger point is calculated based on the additional discharge power available, the maximum temperature allowed inside the power inverter, the current internal temperature, and the rate of temperature increase when additional discharge power is used. The point in time when the extra power from the power inverter must be used is based on the current temperatures of the power inverter and the time it will take for the power inverter to reach its maximum temperature at its highest power setting.

Accordingly, a method is provided for managing demand for an AC client using DC-to-AC power inversion as an auxiliary source of power. The method provides an AC client with a fluctuating AC power grid demand. A DC-to-AC inverter has an input connected to a DC power auxiliary source and selectable inversion power output levels connected to the AC client to supply auxiliary power for a portion of the AC power demand. The method averages the AC grid demand. In each of a series of periodic time intervals, the method compares a current AC grid demand average in a current time interval to a demand goal. A demand goal is defined herein as the highest AC grid demand average, as measured at an end of a time interval and selected from a plurality of time intervals. The method selects the inverter output power level so that the current AC grid demand average is less than or equal to the demand goal by the end of the current time interval.

More explicitly, the method establishes an efficient power trigger level equal to the demand goal, and a continuous power trigger level equal the demand goal plus a leeway margin. As a result, the method selects at least a first inverter output power level, having a first efficiency, when the current AC grid demand average exceeds the efficient power trigger level. At least a second inverter output power level is selected, which is greater than the first inverter output power level and has a second efficiency less than the first efficiency, when the current AC grid demand average exceeds the continuous power trigger level.

In one aspect, the DC-to-AC inverter has a limited availability, selectable third inverter output power level, greater than the second inverter output power level, with a third efficient less than the second efficiency. Then, the method may use the third inverter output power level when required to make the current AC grid demand average less than or equal to the demand goal by the end of the current time interval.

More explicitly, the method calculates the availability of the third inverter output power level in the current time interval. In response to calculating the availability of the third inverter output power level, a maximum power trigger level is established. Then, the third inverter output power level is used when the current AC grid demand average exceeds the maximum power trigger level. In one aspect, the method calculates a B segment of time immediately preceding the end of the current time interval, in which the third inverter output power level is available. The maximum power trigger level is a negative slope, from the end of the current time interval, equal to the third inverter output power level minus the second inverter output power level, divided by the duration of the time interval, and ending at a beginning of the B segment of time. In the "A" segment of time between the end of a previous time interval and the beginning of the B segment of time in the current time interval, the maximum power trigger level may be a constant value equal to the value of the negative slope at the beginning of the B segment of time. Alternatively, the third inverter output power level is only used in the B segment of time.

Additional details of the above-described method, and a system managing AC client demand using DC-to-AC power inversion as an auxiliary source of power, are provided below.

BRIEF DESCRIPTION OF THE DRAWINGS

FIGS. 4A and 4B are a detailed flowchart illustrating a method for enabling the system of FIG. 1 or FIG. 3.

DETAILED DESCRIPTION

Figure 1:
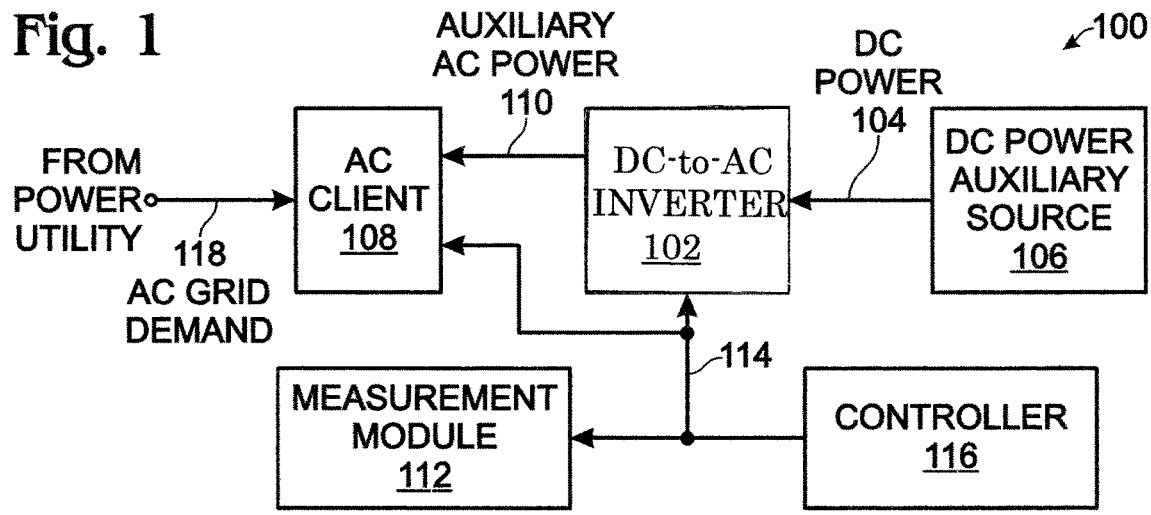
FIG. 1 is a schematic block diagram representing a system for managing demand for an alternating current (AC) client using direct current (DC)-to-AC power inversion as an auxiliary source of power.

FIG. 1 is a schematic block diagram representing a system for managing demand for an alternating current (AC) client using direct current (DC)-to-AC power inversion as an auxiliary source of power. The system 100 comprises a DC-to-AC inverter 102 having an input on line 104 connected to a DC power auxiliary source 106. A battery is one example of a DC power auxiliary source. The inverter 102 has selectable inversion power output levels connected to an AC client 108 on line 110 to supply auxiliary power for a portion of a fluctuating AC grid demand of the client. The AC grid demand is monitored on line 118.

A measurement module 112 has an interface connected to the DC-to-AC inverter on line 114. The measurement module 112 averages the AC grid demand supplied on line 118. In each of a series of periodic time intervals, the measurement module 112 compares a current AC grid demand average in a current time interval to a demand goal. More explicitly, the current AC grid demand average is an average of the AC grid demand, beginning at the start of a current time interval and finishing at the end of the current time interval. The current AC grid demand average resets at the beginning of each new time interval. Alternatively, a rolling interval (e.g., 15-minute) average is used. A demand goal is defined herein as the highest AC grid demand average, as measured at an end of a time interval, and selected from a plurality of time intervals. For example, the plurality of time intervals may encompass a billing month, so that the demand goal is the largest AC grid demand average of that month. In this example, the demand goal would be reset at the beginning of a new billing month.

A controller 116 has an interface connected to the DC-to-AC inverter 102 and measurement module 112 on line 114. The controller 116 selects the DC-to-AC inverter output power level so that the current AC grid demand average is less than or equal to the demand goal by the end of the current time interval.

Figure 2A:
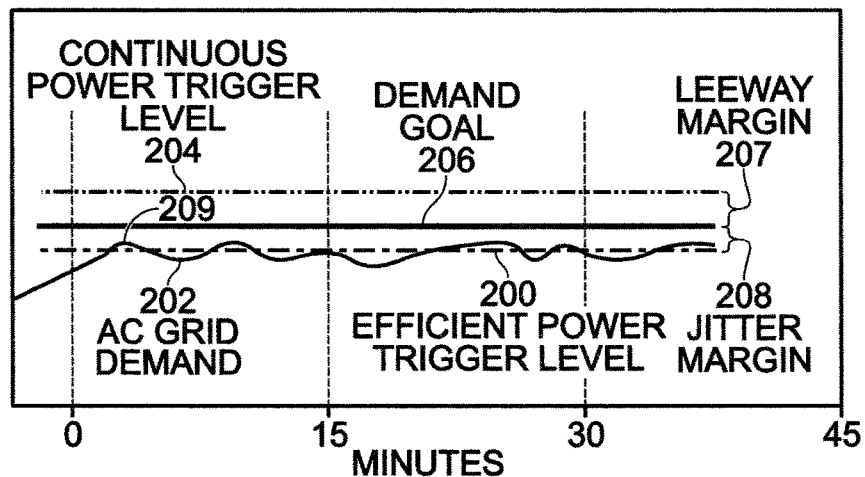
FIGS. 2A through 2F are graphs depicting various aspects of the system of FIG. 1 in use.

FIGS. 2A through 2F are graphs depicting various aspects of the system of FIG. 1 in use. Here, the time intervals are shown as being equal to 15 minutes, but the system is not limited to any particular time interval duration. In one aspect, the measurement module establishes an efficient power trigger level 200 equal to the demand goal 206, and a continuous power trigger level 204 equal the demand goal plus a leeway margin 207. In some aspects, as shown in the examples of FIGS. 2A-2F, the measurement module establishes the efficient power trigger level equal to the demand goal 206 minus a jitter margin 208. In FIG. 2A, the controller selects at least a first inverter output power level, having a first efficiency, when the current AC grid demand average 202 exceeds the efficient power trigger level 200. When the current AC grid demand average 202 is below the efficient power trigger level 200, the inverter supplies no auxiliary AC power to the client. This event occurs a number of times in the figure, one example of which is time 209.

Figure 2B:
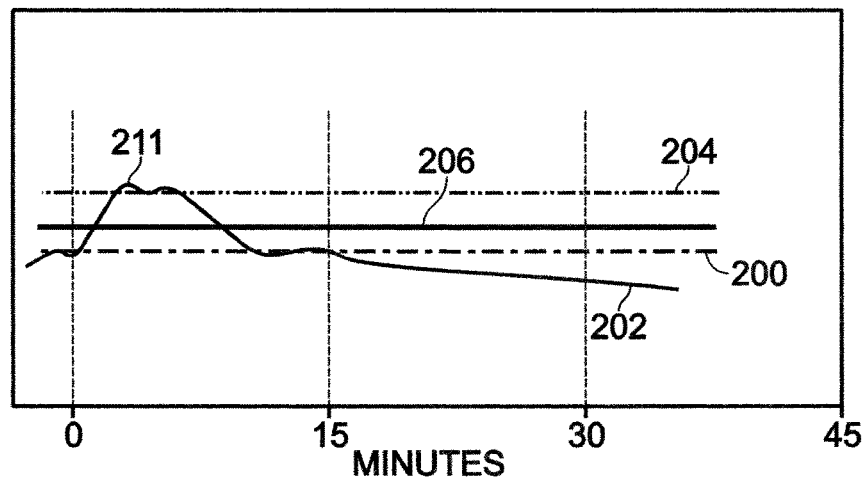

In FIG. 2B, as in FIG. 2A, the controller selects at least the first inverter output power level when the current AC grid demand average 202 exceeds the efficient power trigger level 200. In addition, the controller selects at least a second inverter output power level greater than the first inverter output power level, and having a second efficiency less than the first efficiency, when the current AC grid demand average 202 exceeds the continuous power trigger level 204. This event occurs at an approximate time of 3 to 7 minutes (time 211).

In another aspect, the DC-to-AC inverter has a limited availability, selectable third inverter output power level, greater than the second inverter output power level, with a third efficiency less than the second efficiency. The controller selects the third inverter output power level when required to make the current AC grid demand average less than or equal to the demand goal by the end of the current time interval.

Figure 2C:
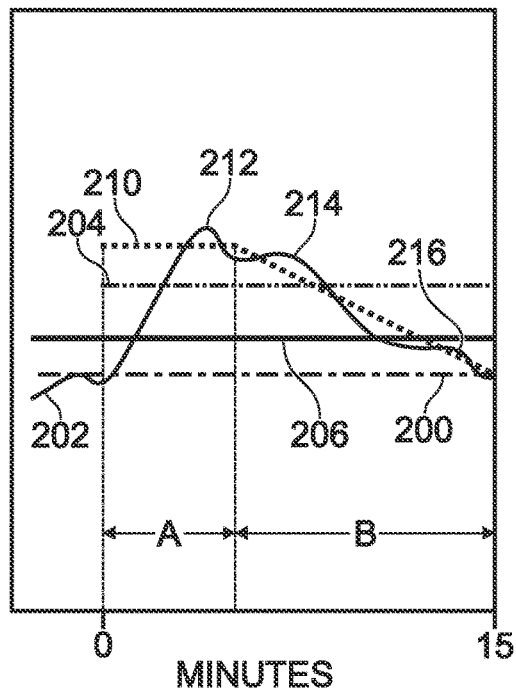

As shown in FIG. 2C, the measurement module calculates the availability of the third inverter output power level in the current time interval, and in response to calculating the availability of the third inverter output power level, establishes a maximum power trigger level 210. The controller selects the third inverter output power when the current AC grid demand average exceeds the maximum power trigger level. This event occurs three times in the time interval from 00 to 15 minutes, at time 212, time 214, and time 216. Generally, the measurement module calculates the availability of the third inverter output power level in response to DC-to-AC inverter temperature and time of use. For example, the measurement module may calculate a heating time, which is a function of the time expected for the DC-to-AC inverter to reach a maximum threshold temperature, from a current temperature, when running at the third inverter output power level. To continue the example, the maximum threshold temperature may be the measured temperature of the DC-to-AC inverter heatsink.

In one aspect, the measurement module calculates a B segment of time immediately preceding the end of the current time interval, in which the third inverter output power level is available. The measurement module establishes the maximum power trigger level 210 by calculating a negative slope, from the end of the current time interval, equal to the third inverter output power level minus the second inverter output power level (continuous power trigger level 204), divided by the duration of the time interval (e.g., 15 minutes), and ending at a beginning of the B segment of time.

Figure 2D:
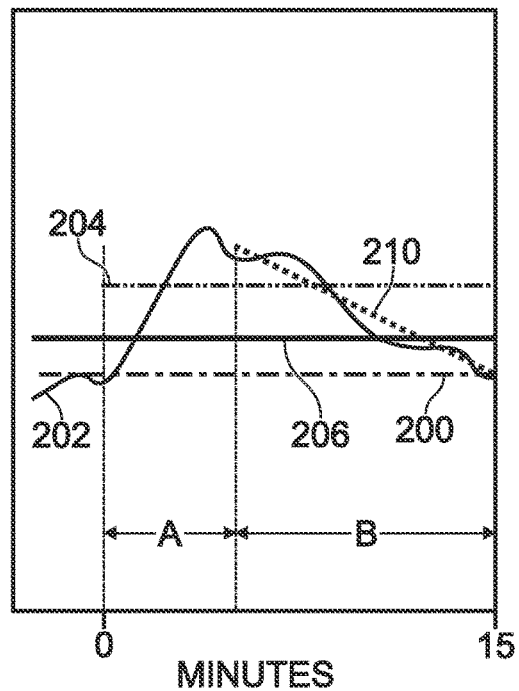

The measurement module calculates an "A" segment of time between the end of a previous time interval and the beginning of the B segment of time in the current time interval. The measurement module establishes a constant value maximum power trigger level 210 in the "A" segment of time equal to the value of the negative slope at the beginning of the B segment of time. Alternatively, as shown in FIG. 2D, the controller selects the third inverter output power level only in the B segment of time. That is, there is no maximum power trigger level in the "A" segment of time. With this option, the third inverter output power level is not used until as-late-as-possible. This allows for the power demand to subside before the third inverter output power is used.

Figure 2E:
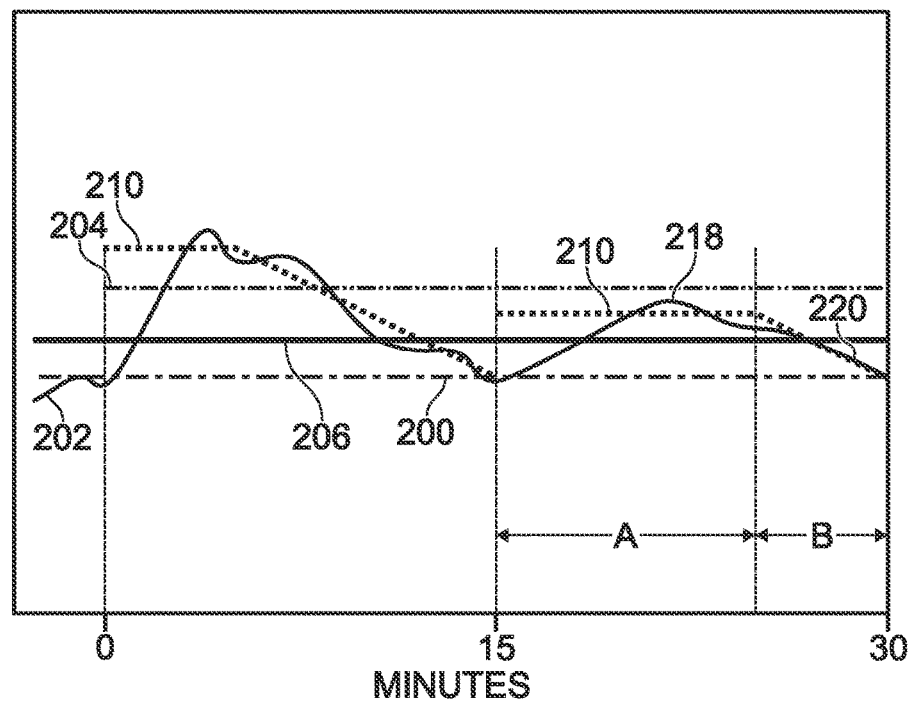

In some aspects, the maximum power trigger level may drop below the continuous power trigger level in time segment "A". Such an event may occur if the third inverter power level was used for a significant period of time in the previous time interval. As shown in FIG. 2E, the controller selects the second inverter output power level when the maximum power trigger level is less than the continuous power trigger level, and the current AC grid demand average is greater than the maximum power trigger level in time segment "A". Just such an event is shown as occurring at time 218 in the interval of time between 15 and 30 minutes.

Figure 2F:
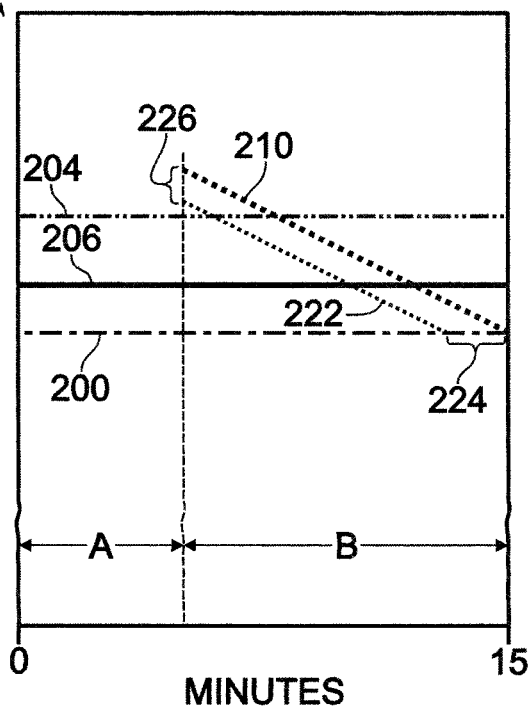

In another aspect, as shown if FIG. 2F, the measurement module establishes a conservative maximum power trigger level 222 by calculating a negative slope, from the end of the current time interval as offset by a safety time margin 224, equal to the third inverter output power level minus the second inverter output power level, divided by the duration of the time interval, minus a safety power margin 226, and ending at the beginning of the B segment of time. In this example, a conservative maximum power trigger level is not established in time segment "A". This option provides a safety margin in the case there is a late excessive power demand. With this margin, a maximum power reserve is available to deal with the unexpected demand. The (non-conservative) maximum power trigger level 210 is shown for reference.

Alternatively but not shown, the measurement module establishes a constant value conservative maximum power trigger level in the "A" segment of time equal to the value of the negative slope at the beginning of the B segment of time. As another alternative not shown, the efficient power trigger level may be set slightly below the maximum power trigger level in the safety time margin 224. Using the first inverter output power level to hold the AC grid demand average down is more desirable than using the third inverter output power.

Figure 3:
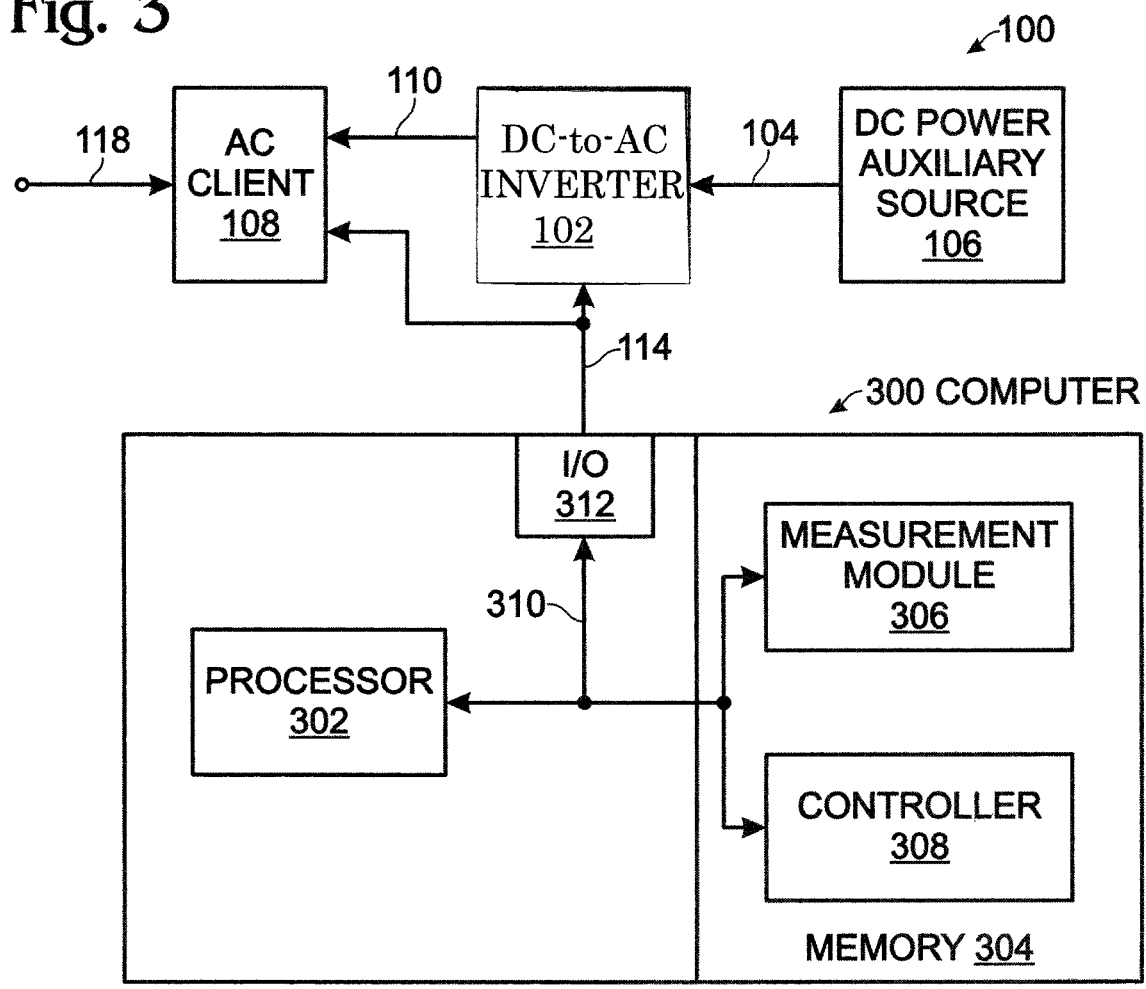
FIG. 3 is a schematic block diagram depicting the system of FIG. 1 with the measurement module and controller enabled as software applications.

FIG. 3 is a schematic block diagram depicting the system of FIG. 1 with the measurement module and controller enabled as software applications. In this aspect, the system 100 comprises a computer 300 with a processor 302, a non-transitory memory 304, a measurement module software application 306 and a controller software application 308. Software applications 306 and 308 are enabled as a sequence of processor-executable instructions stored in the non-transitory memory 304. A bus 310 couples the processor 302 and memory 304. The bus 310 is connected to an input/output (I/O) device 312 to enable communications on line 314.

The non-transitory memory 304 may include a main memory, such as a random access memory (RAM) or other dynamic storage device, coupled to the bus 310 for storing information and instructions to be executed by a processor 302. The memory may include dynamic random access memory (DRAM) and high-speed cache memory. The memory 304 may also comprise a mass storage with one or more magnetic disk or tape drives or optical disk drives, for storing data and instructions for use by processor 302. For a workstation personal computer (PC) 300, for example, at least one mass storage system in the form of a disk drive or tape drive, may store the operating system and application software. The mass storage may also include one or more drives for various portable media, such as a floppy disk, a compact disc read only memory (CD-ROM), or an integrated circuit non-volatile memory adapter (i.e. PC-MCIA adapter) to input and output data and code to and from the processor 302. These memories may also be referred to as a computer-readable medium. The execution of the sequences of instructions contained in a computer-readable medium may cause a processor to perform some of the steps associated with power measurement and inverter output control. Alternately, some of these functions may be performed in hardware. The practical implementation of such a computer system would be well known to one with skill in the art.

In general, if the power inverter has the ability to output at a level higher than its normal continuous output level, then this extra power can be used to force the 15-minute average demand down to the target level just before the measurement point. The effect is to allow the 15-minute average demand to drift above the target demand level for the majority of the measurement period and then make "extra effort" at the end of the period to maintain the peak demand level.

As an example, a power inverter may have the ability to output 30 kilowatts (kW) of AC electric power continuously. It may also have the ability to output 35 kW of electric power as long as the internal heat of the device does not exceed 60 degrees C. In such a case, the power inverter may cycle its power output between 0 and 30 kW to hold the 15-minute average demand (AC grid demand average) at or below the target peak demand level (demand goal). If the 15-minute average peak demand exceeds the target peak near the end of the measurement period, then the power converter may use its ability to discharge at a higher power level to move the average back below the target level. How far above the target level the 15-minute average is allowed to drift depends on the temperature margin inside the power inverter and the time it takes for the power inverter to reach its maximum internal temperature when it is operating above the rated maximum continuous power level.

Figure 4B:
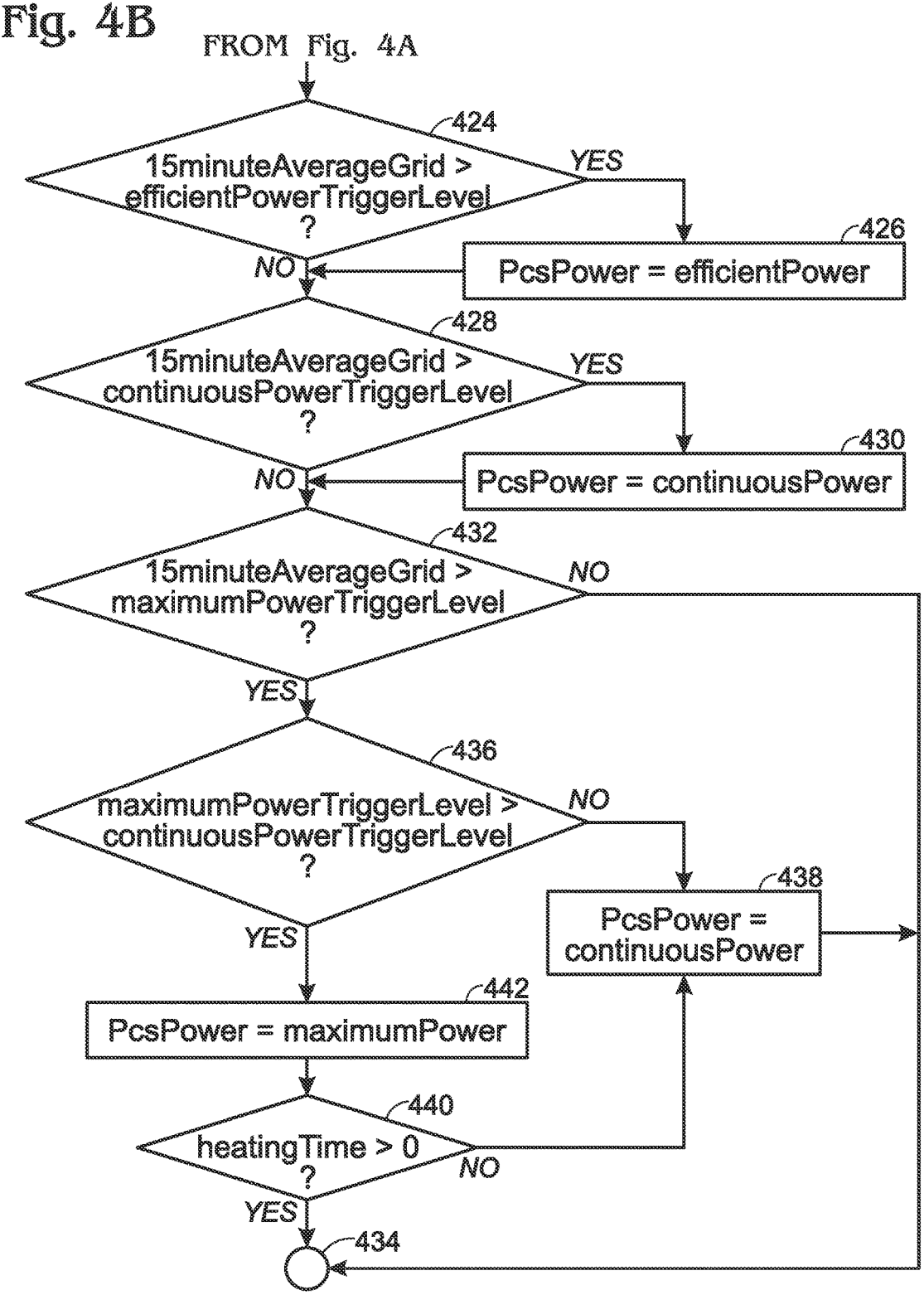

FIGS. 4A and 4B are a detailed flowchart illustrating a method for enabling the system of FIG. 1 or FIG. 3. The method begins at Step 400. In Step 402 PscPower (inverter output power level) is set to zero. In Step 404 the heating time is determined as a function of Maximum PscPower (third inverter output power), PSC (inverter) internal temperature, and the ambient temperature. In Step 406 the time within the current time interval, T, is computed as the current TimeOfDay modulo 15-minute time interval. In Step 408 MaximumDemand (demand goal) is established. In Step 410 the jitter margin (jitterMargin) is set. In Step 412 the efficient power trigger level is established. In Step 414 the continuous power trigger level is established. In Step 416 the slope of the maximum power trigger level in the B segment of time is determined. In Step 418 a determination is made as to whether the time remaining in the current time interval is less than the heating time determined in Step 404. If the determination is "yes", then the third inverter output power is used, and Step 420 sets the maximum power trigger level on the basis of the time remaining in the time interval, and proceeds to Step 424.

If the determination in Step 418 is "no", then the third inverter output power should only be used if necessary, and Step 422 determines the maximum power trigger level on the basis of heating time. Step 424 determines if the 15minuteAverageGrid (AC grid demand average) is greater than the efficient power trigger level. If the determination is "yes", then Step 424 selects the first inverter output power level, and proceeds to Step 428. If the determination in Step 424 is "no", then Step 428 determines if the AC grid demand average is greater than the continuous power trigger level. If the determination is "yes", then Step 430 selects the second inverter power level and proceeds to Step 432. If the determination in Step 428 is "no", Step 432 determines if the AC grid demand average is greater than the maximum power trigger level. If the determination is "no", then the process is terminated at Step 434. If the determination in Step 432 is "yes", Step 436 determines if the maximum power trigger level is greater than the continuous power trigger level. If the determination is "no", then Step 438 selects the second inverter power level. If the determination in Step 436 is "yes", then Step 442 selects the third inverter power level. If Step 440 determines that the heating time is greater than zero, the process terminates at Step 436. Otherwise, if the heating time is equal to zero, the second inverter output power is selected in Step 438.

Figure 5:
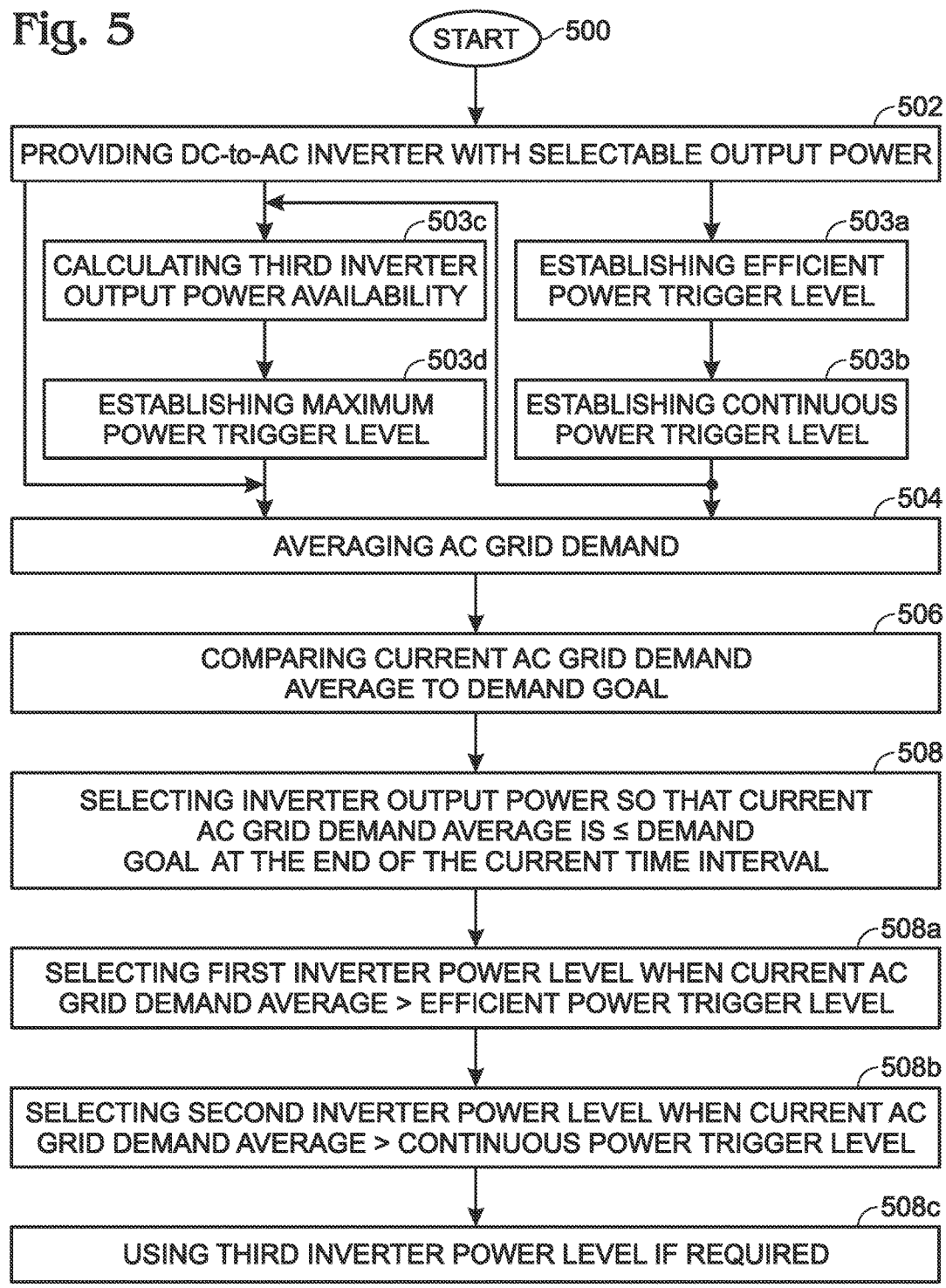
FIG. 5 is a flowchart illustrating a method for managing demand for an AC client using DC-to-AC power inversion as an auxiliary source of power.

FIG. 5 is a flowchart illustrating a method for managing demand for an AC client using DC-to-AC power inversion as an auxiliary source of power. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps and describes the systems of FIGS. 1 and 3. The method starts at Step 500.

Step 502 provides an AC client with a fluctuating AC grid demand. Step 502 also provide a DC-to-AC inverter having an input connected to a DC power auxiliary source and selectable inversion power output levels connected to the AC client, to supply auxiliary power for a portion of the AC power demand. Step 504 averages the AC grid demand to create an AC grid demand average. In each of a series of periodic time intervals, Step 506 compares a current AC grid demand average in a current time interval to a demand goal. The demand goal is the highest AC grid demand average as measured at an end of a time interval, and selected from a plurality of time intervals. Step 508 selects the inverter output power level so that the current AC grid demand average is less than or equal to the demand goal by the end of the current time interval.

In one aspect, Step 503a establishes an efficient power trigger level equal to the demand goal, and Step 503b establishes a continuous power trigger level equal the demand goal plus a leeway margin. As noted above, the efficient power trigger level equal may be set to the demand goal minus a jitter margin. Then, selecting the inverter output power level in Step 508 includes substeps. Step 508a selects at least a first inverter output power level, having a first efficiency, when the current AC grid demand average exceeds the efficient power trigger level. Step 508b selects at least a second inverter output power level greater than the first inverter output power level, and having a second efficiency less than the first efficiency, when the current AC grid demand average exceeds the continuous power trigger level.

In another aspect, Step 502 provides the DC-to-AC inverter with a limited availability, selectable third inverter output power level, greater than the second inverter output power level, with a third efficient less than the second efficiency. Then, selecting the inverter output power level in Step 508 includes using the third inverter output power level when required to make the current AC grid demand average less than or equal to the demand goal by the end of the current time interval, which may be represented by substep 508c.

More explicitly, Step 503c may calculate the availability of the third inverter output power level in the current time interval, and in response to calculating the availability of the third inverter output power level, Step 503d establishes a maximum power trigger level. Thus, Step 508c uses the third inverter output power level when the current AC grid demand average exceeds the maximum power trigger level. Typically, Step 503c calculates the availability of the third inverter output power level in the current time interval in response to DC-to-AC inverter temperature and time of use. That is, Step 503c calculates a heating time, which is a function of the time expected for the DC-to-AC inverter to reach a maximum threshold temperature, from a current temperature, when running at the third inverter output level In one aspect, Step 503c calculates a B segment of time immediately preceding the end of the current time interval, in which the third inverter output power level is available. Step 503d then calculates a negative slope, from the end of the current time interval, equal to the third inverter output power level minus the second inverter output power level, divided by the duration of the time interval, and ending at a beginning of the B segment of time.

In one aspect, Step 503c calculates an "A" segment of time between the end of a previous time interval and the beginning of the B segment of time in the current time interval. Then, Step 503d establishes a constant value maximum power trigger level in the "A" segment of time equal to the value of the negative slope at the beginning of the B segment of time. Alternatively, in Step 508 the third inverter output power level is only used in the B segment of time. That is, Step 503d does not establish a maximum power trigger level in the "A" segment of time.

In another aspect, Step 503d establishes the maximum power trigger level at a level that is less than the continuous power trigger level, in which case Step 508 selects the second inverter output power level when the current AC grid demand average is greater than the maximum power trigger level.

In a different aspect, Step 503d establishes a conservative maximum power trigger level by calculating a negative slope, from the end of the current time interval as offset by a safety time margin, equal to the third inverter output power level minus the second inverter output power level, divided by the duration of the time interval, minus a safety power margin and ending at the beginning of the B segment of time.

A system and method have been provided for managing AC demand for client using a DC-to-AC power inversion as an auxiliary source of power. Examples of particular process steps and trigger scenarios have been presented to illustrate the invention. However, the invention is not limited to merely these examples. Other variations and embodiments of the invention will occur to those skilled in the art.

We claim:
1. A method for managing demand for an alternating current (AC) client using direct current (DC)-to-AC power inversion as an auxiliary source of power, the method comprising:
  providing an AC client with a fluctuating AC grid demand, a DC-to-AC inverter having an input connected to a DC power auxiliary source and selectable inversion power output levels connected to the AC client to supply auxiliary power for a portion of the AC power demand;

averaging the AC grid demand;

in each of a series of periodic time intervals, comparing a current AC grid demand average in a current time interval to a demand goal, which is a highest AC grid demand average as measured at an end of a time interval, and selected from a plurality of time intervals; and, selecting the DC-to-AC inverter output power level so that the current AC grid demand average is less than or equal to the demand goal by the end of the current time interval.

2. The method of claim 1 further comprising:

establishing an efficient power trigger level equal to the demand goal;

establishing a continuous power trigger level equal the demand goal plus a leeway margin;

wherein selecting the inverter output power level so that the current AC grid demand average is less than or equal to the demand goal by the end of the current time interval includes:

selecting at least a first DC-to-AC inverter output power level, having a first efficiency, when the current AC grid demand average exceeds the efficient power trigger level; and, selecting at least a second DC-to-AC inverter output power level greater than the first DC-to-AC inverter output power level, and having a second efficiency less than the first efficiency, when the current AC grid demand average exceeds the continuous power trigger level.

3. The method of claim 2 wherein providing the DC-to-AC inverter includes the DC-to-AC inverter having a limited availability, selectable third DC-to-AC inverter output power level, greater than the second DC-to-AC inverter output power level, with a third efficiency less than the second efficiency; and, wherein selecting the DC-to-AC inverter output power level so that the current AC grid demand average is less than or equal to the demand goal by the end of the current time interval includes using the third DC-to-AC inverter output power level when required to make the current AC grid demand average less than or equal to the demand goal by the end of the current time interval.

4. The method of claim 3 further comprising:

calculating the availability of the third DC-to-AC inverter output power level in the current time interval;

in response to calculating the availability of the third DC-to-AC inverter output power level, establishing a maximum power trigger level; and, wherein using the third DC-to-AC inverter output power level when required includes using the third DC-to-AC inverter output power level when the current AC grid demand average exceeds the maximum power trigger level.

5. The method of claim 4 wherein calculating the availability of the third DC-to-AC inverter output power level includes calculating a "B" segment of time immediately preceding the end of the current time interval, in which the third DC-to-AC inverter output power level is available; and, wherein establishing the maximum power trigger level includes calculating a negative slope, from the end of the current time interval, equal to the third DC-to-AC inverter output power level minus the second DC-to-AC inverter output power level, divided by the duration of the time interval, and ending at a beginning of the "B" segment of time.

6. The method of claim 5 wherein calculating the availability of the third DC-to-AC inverter output power level includes calculating an "A" segment of time between the end of a previous time interval and the beginning of the "B" segment of time in the current time interval; and, wherein establishing the maximum power trigger level includes establishing a constant value maximum power trigger level in the "A" segment of time equal to the value of the negative slope at the beginning of the "B" segment of time.

7. The method of claim 6 wherein calculating the availability of the third DC-to-AC inverter output power level in the current time interval includes calculating the availability in response to DC-to-AC inverter temperature and time of use.

8. The method of claim 7 wherein calculating the "B" segment of time in which the third DC-to-AC inverter output power level is available includes calculating a heating time, which is a function of the time expected for the DC-to-AC inverter to reach a maximum threshold temperature, from a current temperature, when running at the third DC-to-AC inverter output level.

9. The method of claim 5 wherein calculating the availability of the third DC-to-AC inverter output power level includes calculating an "A" segment of time between the end of a previous time interval and the beginning of the "B" segment of time in the current time interval; and, wherein using the third DC-to-AC inverter output power level when required includes using the third DC-to-AC inverter output power level only in the "B" segment of time.

10. The method of claim 5 wherein establishing the maximum power trigger level includes establishing a conservative maximum power trigger level by calculating a negative slope, from the end of the current time interval as offset by a safety time margin, equal to the third DC-to-AC inverter output power level minus the second DC-to-AC inverter output power level, divided by the duration of the time interval, minus a safety power margin and ending at the beginning of the "B" segment of time.

11. The method of claim 4 wherein establishing the maximum power trigger level includes establishing a maximum power trigger level less than the continuous power trigger level;

wherein selecting the DC-to-AC inverter output power level so that the current AC grid demand average is less than or equal to the demand goal by the end of the current time interval includes using the second DC-to-AC inverter output power level when the current AC grid demand average is greater than the maximum power trigger level.

12. The method of claim 2 wherein establishing the efficient power trigger level equal to the demand goal includes establishing the efficient power trigger level equal to the demand goal minus a jitter margin.

13. A system for managing demand for an alternating current (AC) client using direct current (DC)-to-AC power inversion as an auxiliary source of power, the system comprising:

a DC-to-AC inverter having an input connected to a DC power auxiliary source and selectable inversion power output levels connected to an AC client to supply auxiliary power for a portion of a fluctuating AC grid demand;

a measurement module having an interface connected to the AC client, the measurement module averaging the AC grid demand, and in each of a series of periodic time intervals, comparing a current AC grid demand average in a current time interval to a demand goal, which is a highest AC grid demand average as measured at an end of a time interval, and selected from a plurality of time intervals; and, a controller having an interface connected to the DC-to-AC inverter and measurement module, the controller selecting the DC-to-AC inverter output power level so that the current AC grid demand average is less than or equal to the demand goal by the end of the current time interval.

14. The system of claim 13 wherein the measurement module establishes an efficient power trigger level equal to the demand goal, and a continuous power trigger level equal the demand goal plus a leeway margin; and, wherein the controller selects at least a first DC-to-AC inverter output power level, having a first efficiency, when the current AC grid demand average exceeds the efficient power trigger level, and selects at least a second DC-to-AC inverter output power level greater than the first DC-to-AC inverter output power level, and having a second efficiency less than the first efficiency, when the current AC grid demand average exceeds the continuous power trigger level.

15. The system of claim 14 wherein the DC-to-AC inverter has a limited availability, selectable third DC-to-AC inverter output power level, greater than the second DC-to-AC inverter output power level, with a third efficiency less than the second efficiency; and, wherein the controller selects the third DC-to-AC inverter output power level when required to make the current AC grid demand average less than or equal to the demand goal by the end of the current time interval.

16. The system of claim 15 wherein the measurement module calculates the availability of the third DC-to-AC inverter output power level in the current time interval, and in response to calculating the availability of the third DC-to-AC inverter output power level, establishes a maximum power trigger level; and, wherein the controller selects the third DC-to-AC inverter output power when the current AC grid demand average exceeds the maximum power trigger level.

17. The system of claim 16 wherein the measurement module calculates a "B" segment of time immediately preceding the end of the current time interval, in which the third DC-to-AC inverter output power level is available, and establishes the maximum power trigger level by calculating a negative slope, from the end of the current time interval, equal to the third DC-to-AC inverter output power level minus the second DC-to-AC inverter output power level, divided by the duration of the time interval, and ending at a beginning of the "B" segment of time.

18. The system of claim 17 wherein the measurement module calculates an "A" segment of time between the end of a previous time interval and the beginning of the "B" segment of time in the current time interval, and establishes a constant value maximum power trigger level in the "A" segment of time equal to the value of the negative slope at the beginning of the "B" segment of time.

19. The system of claim 18 wherein the measurement module calculates the availability of the third DC-to-AC inverter output power level in response to DC-to-AC inverter temperature and time of use.

20. The system of claim 19 wherein the measurement module calculates a heating time, which is a function of the time expected for the DC-to-AC inverter to reach a maximum threshold temperature, from a current temperature, when running at the third DC-to-AC inverter output power level.

21. The system of claim 18 wherein the controller selects the second DC-to-AC inverter output power level when the maximum power trigger level is less than the continuous power trigger level, and the current AC grid demand average is greater than the maximum power trigger level.

22. The system of claim 17 wherein the measurement module calculates an "A" segment of time between the end of a previous time interval and the beginning of the "B" segment of time in the current time interval; and, wherein the controller selects the third DC-to-AC inverter output power level only in the "B" segment of time.

23. The system of claim 17 wherein the measurement module establishes a conservative maximum power trigger level by calculating a negative slope, from the end of the current time interval as offset by a safety time margin, equal to the third DC-to-AC inverter output power level minus the second DC-to-AC inverter output power level, divided by the duration of the time interval, minus a safety power margin, and ending at the beginning of the "B" segment of time.

24. The system of claim 14 wherein measurement module establishes the efficient power trigger level equal to the demand goal minus a jitter margin.

* * * * *